United States Patent
Leitner et al.

(10) Patent No.: US 11,198,391 B2
(45) Date of Patent: Dec. 14, 2021

(54) CRANE CONTROL COMPRISING A VISUALISATION APPARATUS

(71) Applicant: EPSILON Kran GmbH., Salzburg (AT)

(72) Inventors: Josef Leitner, Fuschl am See (AT); Martin Galler, Adnet (AT)

(73) Assignee: EPSILON Kran GmbH, Salzburg (AT)

( * ) Notice: Subject to any disclaimer, the term of this patent is extended or adjusted under 35 U.S.C. 154(b) by 0 days.

(21) Appl. No.: 16/509,726

(22) Filed: Jul. 12, 2019

(65) Prior Publication Data

US 2020/0017027 A1    Jan. 16, 2020

(30) Foreign Application Priority Data

Jul. 13, 2018 (EP) .................................... 18183445

(51) Int. Cl.
| | |
|---|---|
| *B60R 1/00* | (2006.01) |
| *H04N 13/204* | (2018.01) |
| *B66C 13/18* | (2006.01) |
| *B66C 15/06* | (2006.01) |
| *G06T 19/00* | (2011.01) |
| *G09G 5/377* | (2006.01) |

(52) U.S. Cl.
CPC ................ *B60R 1/00* (2013.01); *B66C 13/18* (2013.01); *B66C 15/065* (2013.01); *G06T 19/006* (2013.01); *G09G 5/377* (2013.01); *H04N 13/204* (2018.05); *B60R 2300/107* (2013.01); *B60R 2300/305* (2013.01); *G09G 2354/00* (2013.01)

(58) Field of Classification Search
CPC ............................ H04N 13/204; G06T 19/006
USPC .......................................................... 345/633
See application file for complete search history.

(56) References Cited

U.S. PATENT DOCUMENTS

| | | | |
|---|---|---|---|
| 10,495,880 B2 | 12/2019 | Rantala et al. | |
| 2013/0345857 A1* | 12/2013 | Lee | B66C 13/48 700/229 |

(Continued)

FOREIGN PATENT DOCUMENTS

| | | |
|---|---|---|
| JP | 09-194186 | 7/1997 |
| JP | 2000-247572 | 9/2000 |
| JP | 2006-327722 | 12/2006 |

(Continued)

OTHER PUBLICATIONS

Search Report dated Jan. 23, 2019 in European Patent Application No. 18183445, with English translation.

*Primary Examiner* — Shivang I Patel
(74) *Attorney, Agent, or Firm* — Wenderoth, Lind & Ponack, L.L.P.

(57) ABSTRACT

A crane control for a crane includes a visualization apparatus which is adapted to generate a stereoscopically visualized camera image having depth information of a working environment of the crane for an operator of the crane control. The visualization apparatus is configured to generate in a representation overlying the camera image a graphic auxiliary representation representing a dimension which can be recognized per se in the camera image. Furthermore, the visualization apparatus includes a display device which displays the stereoscopically visualized camera image together with the overlying graphic auxiliary representation.

12 Claims, 8 Drawing Sheets

(56) References Cited

U.S. PATENT DOCUMENTS

2016/0292918 A1* 10/2016 Cummings ........ G02B 27/0101
2018/0252921 A1*  9/2018 Rantala ................... B66C 17/00

FOREIGN PATENT DOCUMENTS

| JP | 2012-030950 | 2/2012 |
| JP | 2013-159480 | 8/2013 |
| JP | 2016-013889 | 1/2016 |
| JP | 2016-199388 | 12/2016 |
| JP | 2018-95374 | 6/2018 |
| KR | 10-2018-0001069 | 1/2018 |
| RU | 2 660 631 | 7/2018 |
| WO | 2017/032922 | 3/2017 |

* cited by examiner

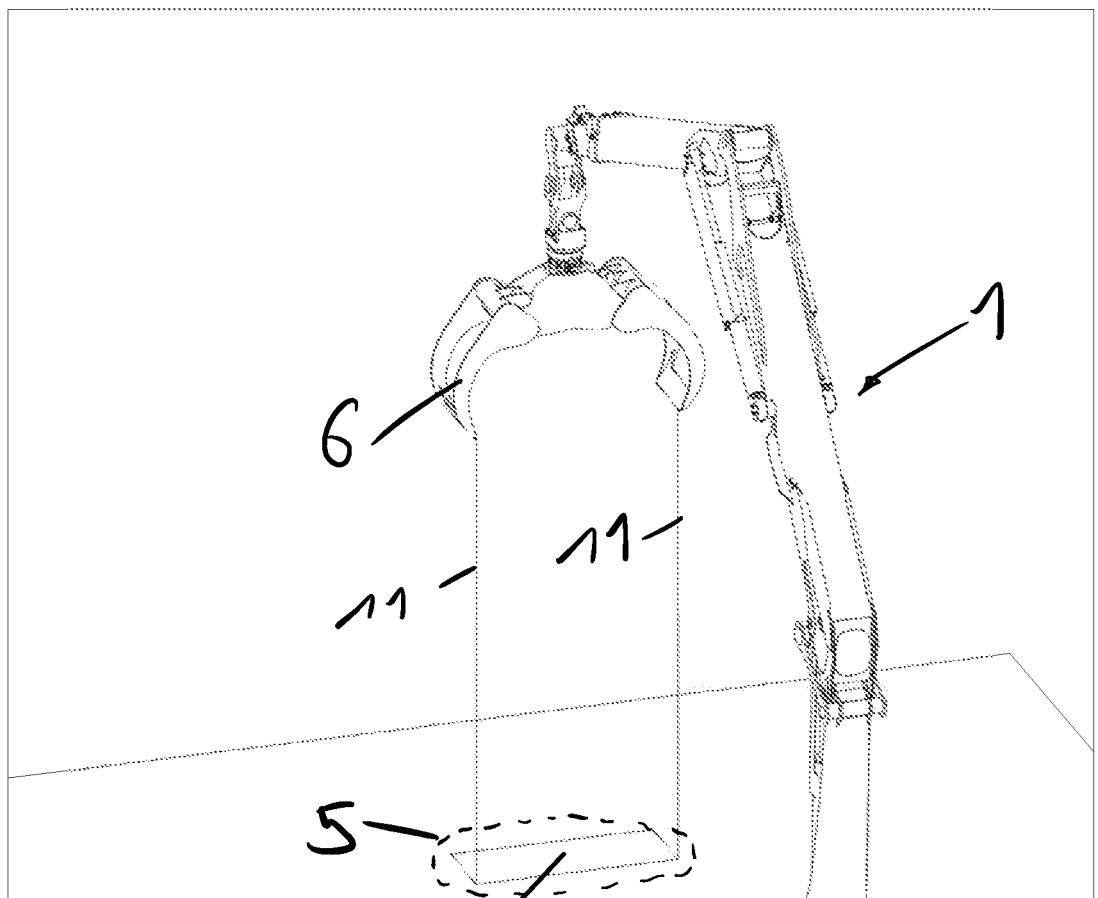

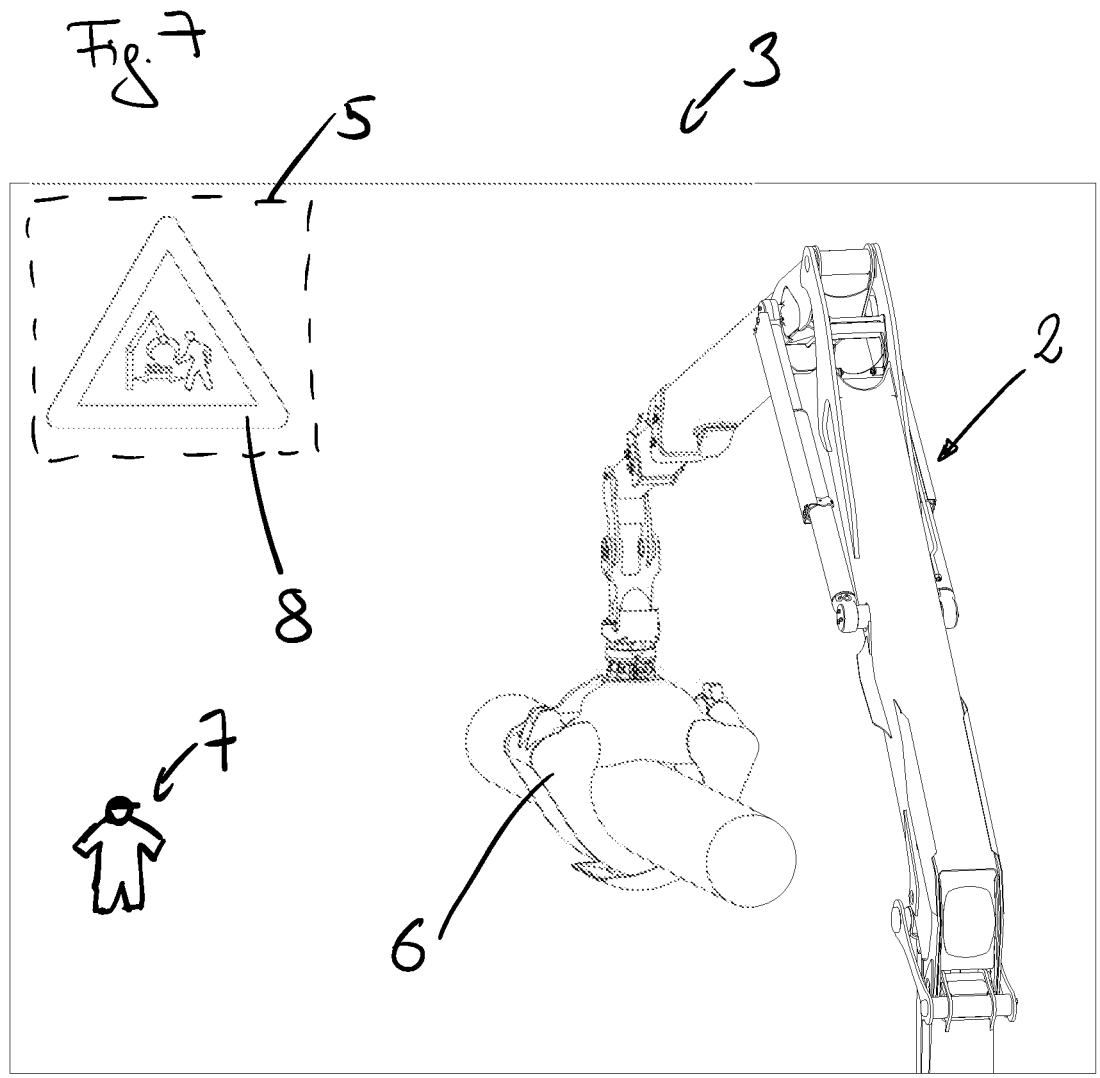

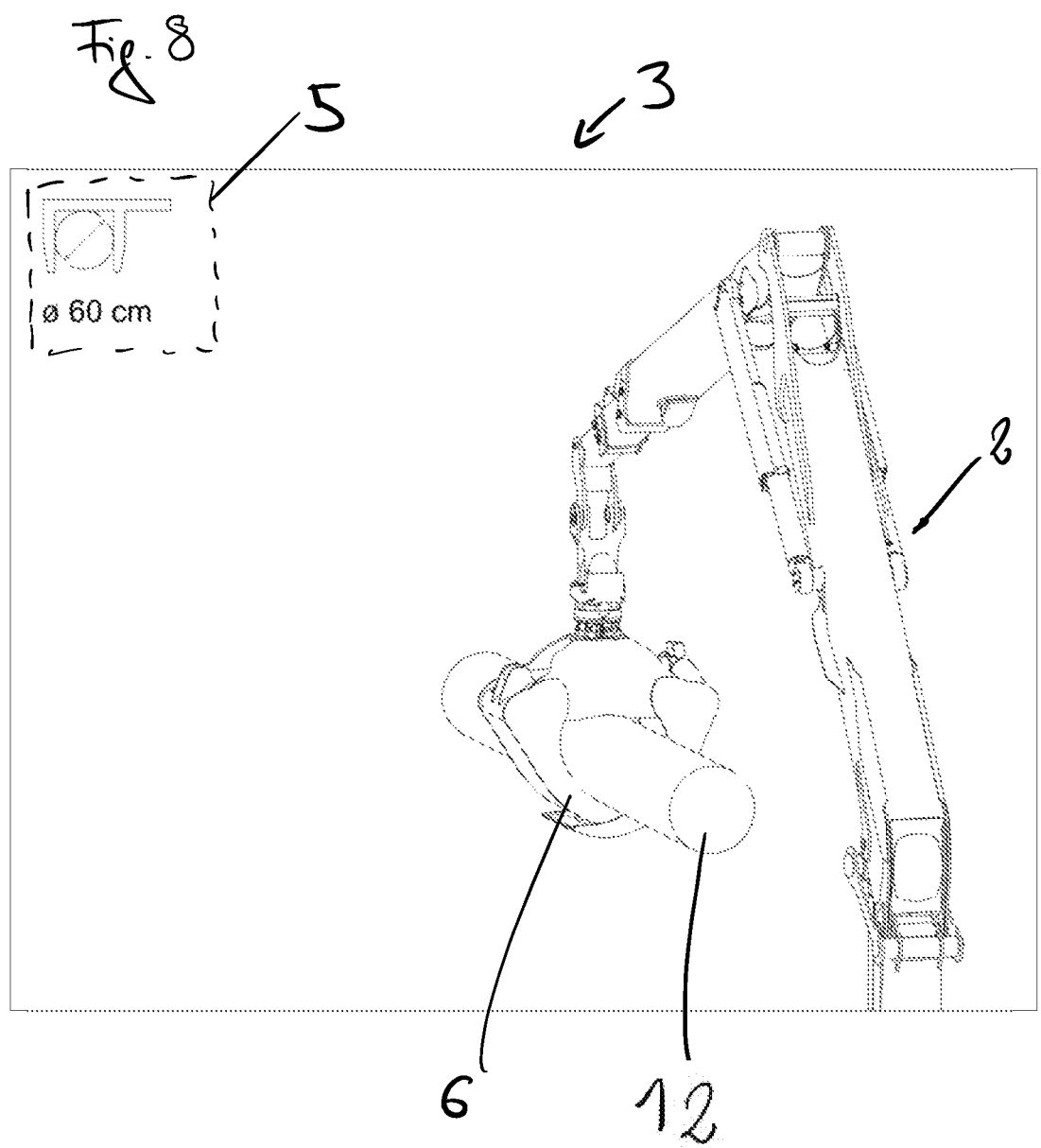

CRANE CONTROL COMPRISING A VISUALISATION APPARATUS

BACKGROUND OF THE INVENTION

The invention concerns a crane control for a crane, and a crane comprising such a crane control.

Crane controls having a visualization apparatus are already known, in which the visualization apparatus is adapted to stereoscopically visualize (generate) a camera image having depth information of a working environment of the crane for an operator of the crane control.

When using such crane controls, it can be difficult for an operator to correctly interpret the depth information contained in the stereoscopic camera image. That can result in operating errors extending as far as damage to the crane or the working environment.

SUMMARY OF THE INVENTION

The object of the invention is to provide a crane controller of the general kind set forth and a crane having such a crane controller, in which it is easier for the operator correctly to interpret the depth information contained in the stereoscopic camera image.

That object is attained by a crane controller and a crane having such a crane controller, as described below.

The visualization apparatus is configured to display in a representation overlying the camera image a graphic auxiliary representation which represents a dimension which can be recognized per se in the camera image, and the visualization apparatus includes a display device which displays the stereoscopically visualized camera image (stereoscopic camera image) together with the overlying graphic auxiliary representation. Therefore, the operator no longer has to rely exclusively on the perception afforded by the display device of a dimension derived from the depth information. That results in a relief in stress on the operator and more accurate and more reliable control of the crane.

In an embodiment of the invention, the display device is in the form of virtual reality goggles or a 3D display screen.

In an embodiment of the invention, the graphic auxiliary representation represents a spacing of a predeterminable or predetermined working part of the crane in relation to a predeterminable or predetermined reference object in the working environment of the crane. The reference object can be, for example, an item to be gripped, a person, an animal, a vehicle, an obstacle or a support surface or the ground.

The graphic auxiliary representation can include a warning representation which is visualized when the spacing between the predeterminable or predetermined working part of the crane and the predeterminable or predetermined reference object is below a predeterminable value.

In an embodiment of the invention, the spacing of the predeterminable or predetermined working part of the crane in relation to the predeterminable or predetermined reference object is represented in the form of a marking appearing in size proportionally to the spacing, preferably at a surface of the reference object that faces towards the working part of the crane. The marking can be, for example, in the form of a circle, rectangle, cross, square, cube or the like.

In an embodiment of the invention, the graphic auxiliary representation represents a dimension of a predeterminable or predetermined working part of the crane in relation to a predeterminable or predetermined reference object in the working environment of the crane.

Preferably, the graphic auxiliary representation represents a dimension of a predeterminable or predetermined working part of the crane.

In that respect, the graphic auxiliary representation is visualized on a surface that is towards the working part of the crane of a reference object disposed beneath the working part.

A crane can also include the proposed crane control.

BRIEF DESCRIPTION OF THE DRAWINGS

Embodiments of the invention are described with reference to the Figures in which:

FIGS. 5 and 6 shows visualized camera images of a further embodiment of a proposed crane control, FIG. 7 shows a visualized camera image of a further embodiment of a proposed crane control, and FIG. 8 shows a visualized camera image of a further embodiment of a proposed crane control.

DETAILED DESCRIPTION OF THE INVENTION

Figure 1:
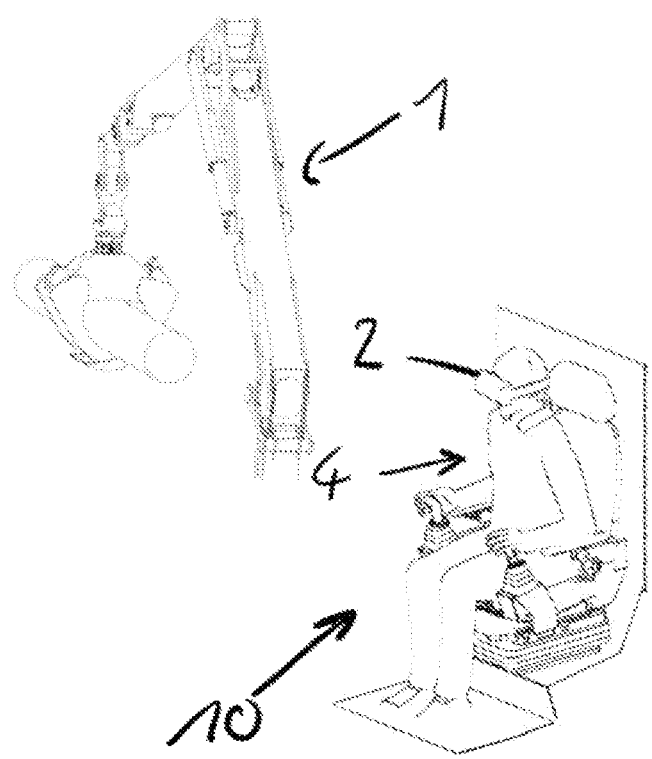
FIG. 1 shows a crane control for a crane.

FIG. 1 shows a crane controller for a crane 1. The crane 1 is controlled by an operator 4 by an operating apparatus 10. To visualize the working environment of the crane 1, the operator wears a visualization apparatus 2 which includes a display device in the form of virtual reality goggles (or otherwise than as illustrated in the form of a 3D display screen). The visualization apparatus 2 is adapted to generate a camera image 3 of a portion of the working environment of the crane 1 for the operator of the crane control.

Figure 2:
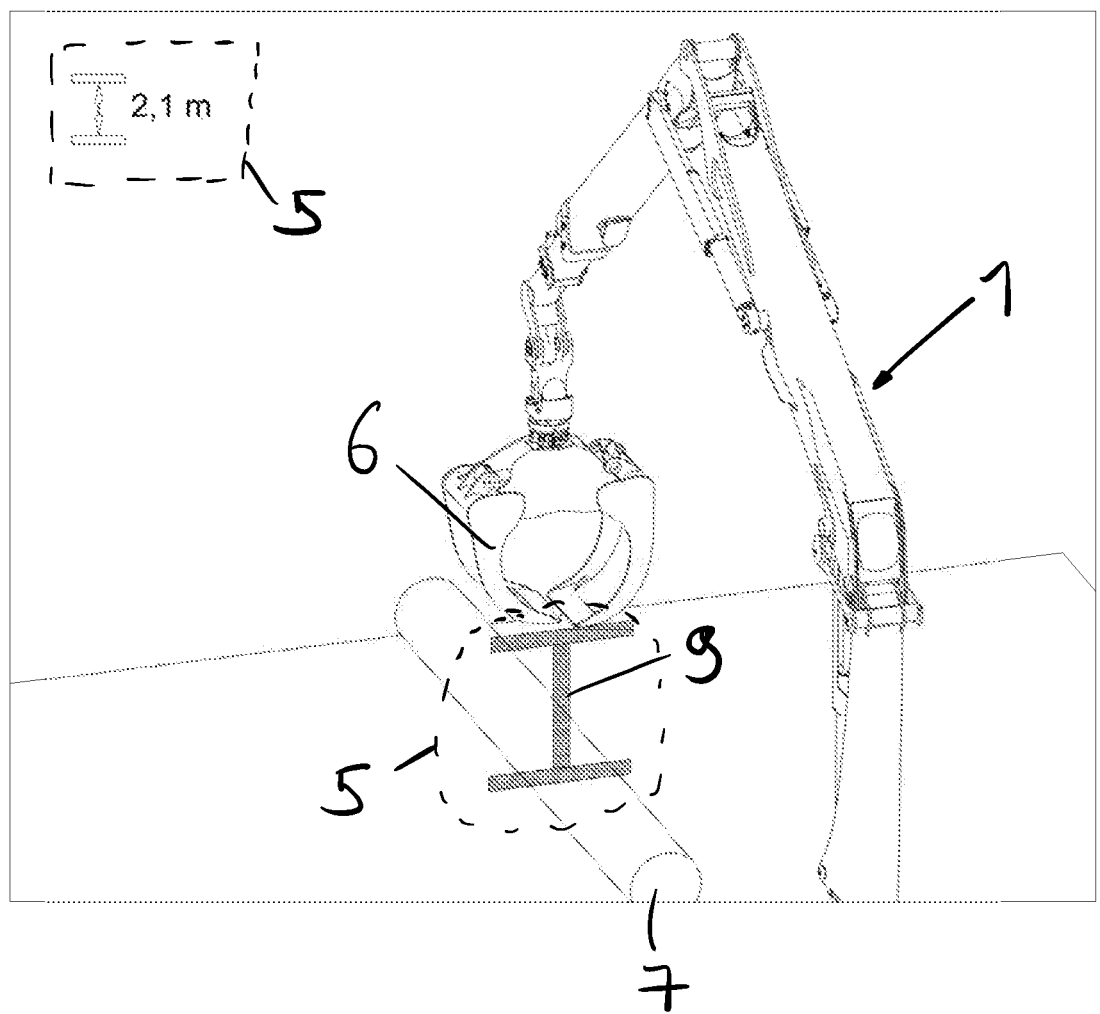
FIG. 2 shows a visualized camera image of an embodiment of a proposed crane control.

FIG. 2 shows a visualized camera image 3 of an embodiment of a proposed crane control. A graphic auxiliary representation 5 which is superimposed on the visualized camera image 3 includes a marking 9 which represents the spacing between a working part 6 of a crane 1 in the form of a gripper and a surface facing towards the working part 6, of a reference object 7 in the form of a log as an item to be gripped. In addition, the graphic auxiliary representation 5 includes a numerical display of the spacing.

Figure 3:
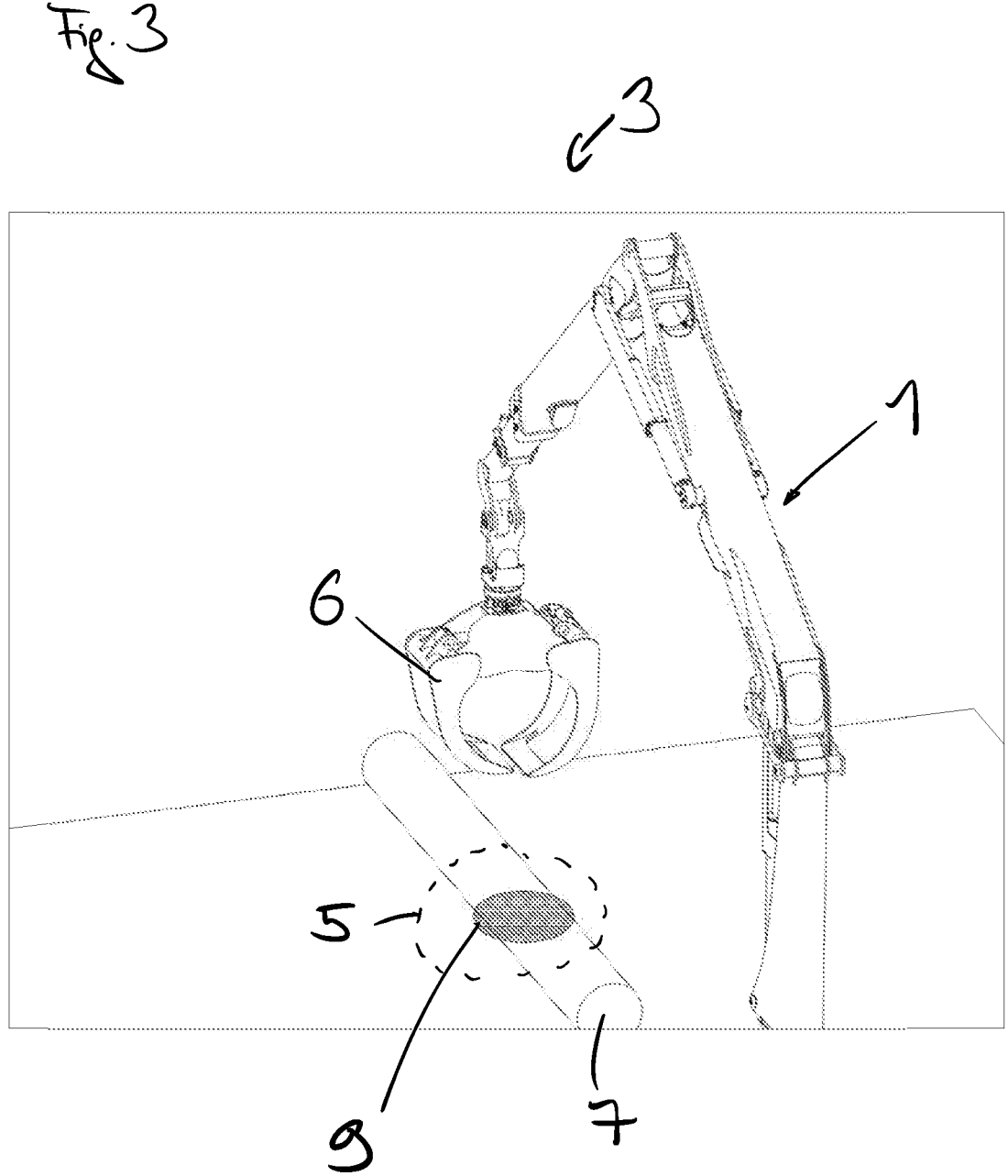
FIGS. 3 and 4 shows visualized camera images of a further embodiment of a proposed crane control.
Figure 4:
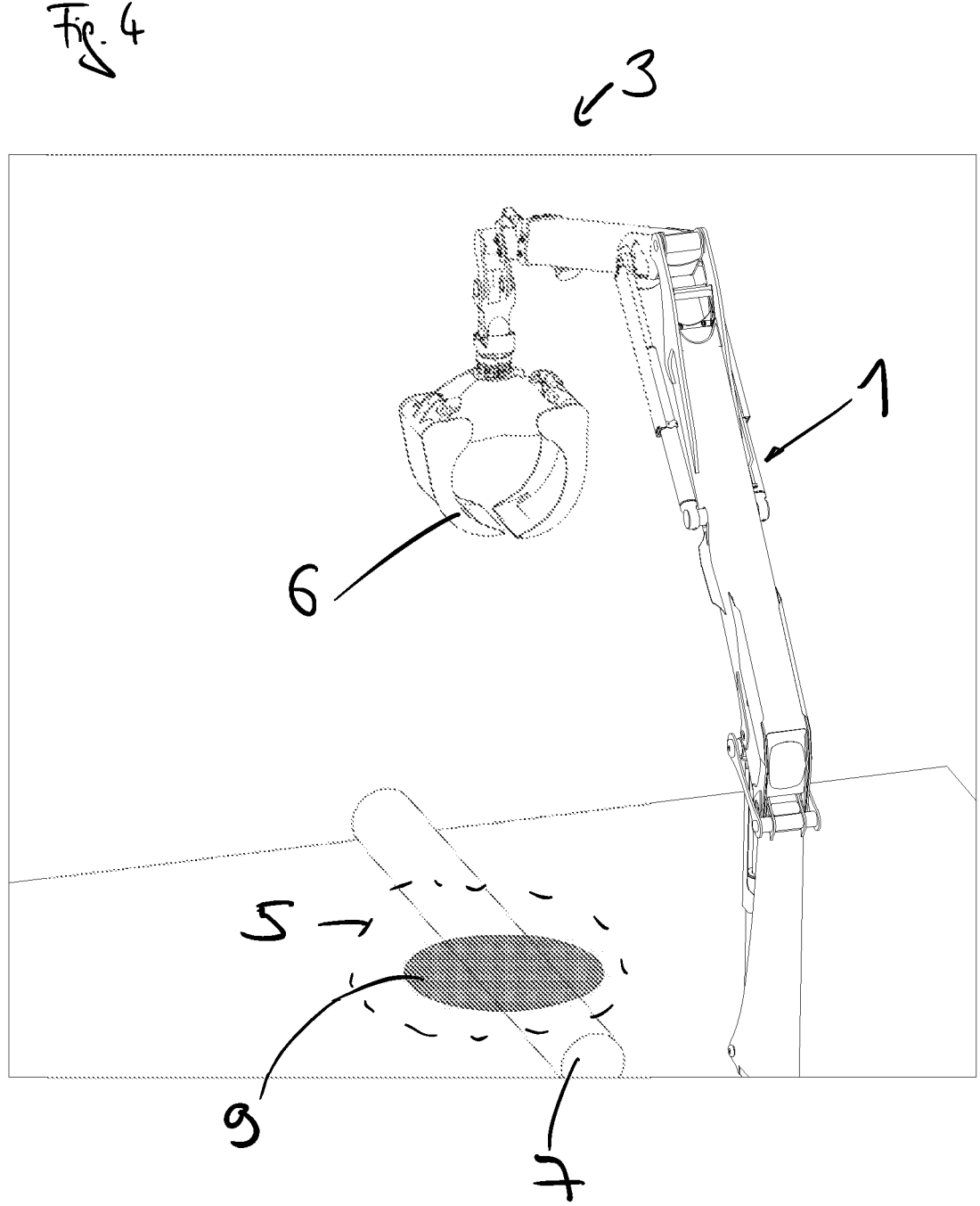

FIGS. 3 and 4 show visualized camera images 3 of an embodiment of a proposed crane control. A graphic auxiliary representation 5 includes a marking 9 with which a spacing of a working part 6 of the crane 1 in relation to a reference object 7 is represented. A comparison between FIGS. 3 and 4 shows the illustrated marking 9 (which here is circular) is proportional in size to the spacing between the working part 6 of the crane 1 and the reference object 7.

Figure 5:
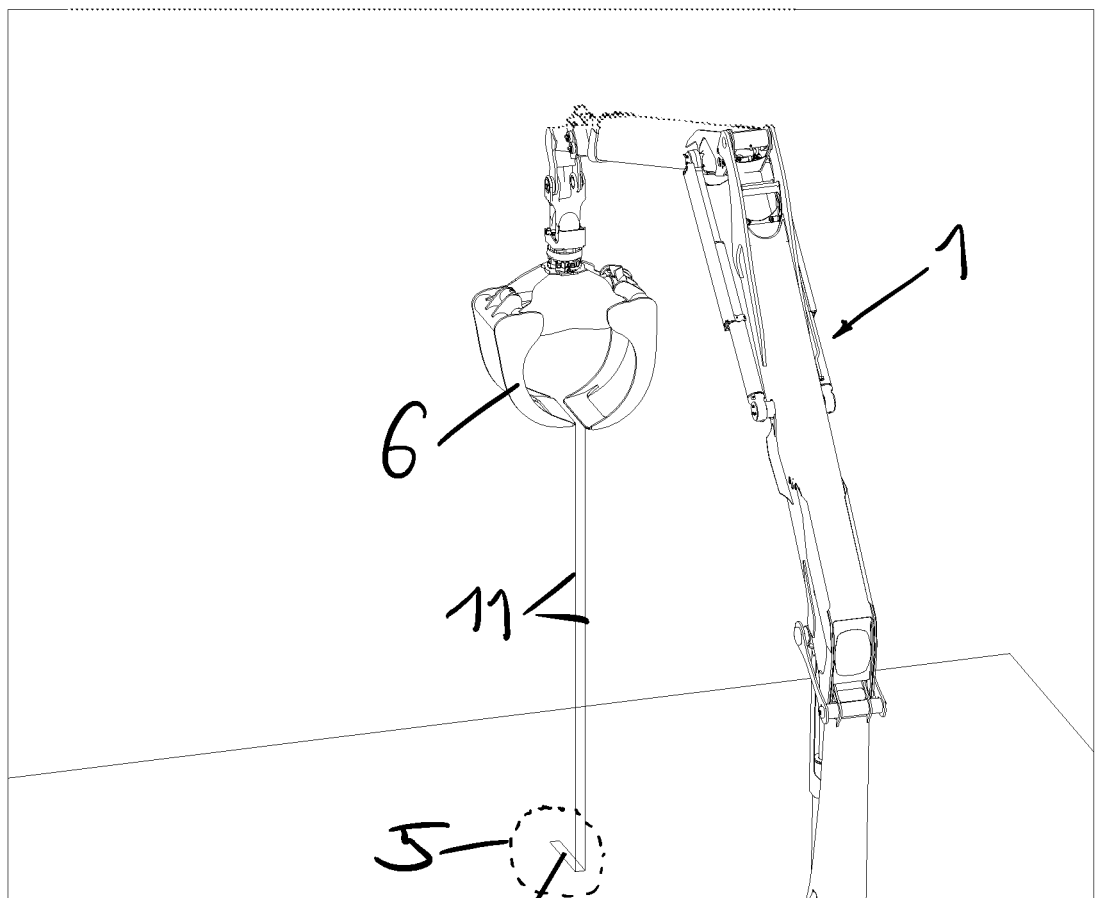

FIGS. 5 and 6 show visualized camera images 3 of an embodiment of a proposed crane control. A graphic auxiliary representation 5 which is superimposed on the visualized camera image 3 includes a projection 13 which represents a dimension of a working part 6 of the crane 1. The working part 6 of the crane 1 is here in the form of a gripper having two gripper jaws. The graphic auxiliary representation 5 includes a spacing of the gripper jaws, which can be detected for example by an opening angle of the gripper jaws. A dimension of the edges of the gripper jaws can also be represented by the graphic auxiliary representation 5. The dimension represented by the graphic auxiliary representation 5 can self-evidently be proportional to the dimensions of the working part 6—as can also be seen from a comparison of FIGS. 5 and 6. The fall lines 11 can be optionally represented.

FIG. 7 shows a visualized camera image 3 of an embodiment of a proposed crane control. A graphic auxiliary representation 5 here includes a warning representation 8 which is displayed when the spacing between a working part 6 of the crane 1 and a reference object 7, here by way of example in the form of a person within a certain distance of the crane 1, is below a predeterminable value.

The graphic auxiliary representations 5 shown in FIGS. 3 to 7, in the respective visualized camera images 3, can also include a numerical display of the spacing, as shown in the example in FIG. 2.

Preferably, the proposed crane control includes at least one operating device actuable by the operator 4 for controlling crane movements of the crane 1. The at least one actuable operating device can be for example a joystick which permits movements of a tip of the crane 1 with a plurality of, for example three, degrees of freedom. The joystick can permit a per se known crane tip control or coordinate control. By virtue thereof, upon deflection of the joystick in a direction corresponding to a vertical direction of movement of the crane tip, the crane 1 can be actuated by the crane control in such a way that the tip of the crane 1 actually moves along a vertical line. Likewise corresponding movements in the other degrees of freedom are possible. When using such a crane tip control or coordinate control, the graphic auxiliary representations shown in FIGS. 3 to 7 are particularly advantageous as the crane tip of the crane 1 can be moved linearly (for example along a vertical line) by virtue of actuation by the crane tip control or coordinate control.

FIG. 8 shows a visualized camera image 3 of an embodiment of a proposed crane control. A graphic auxiliary representation 5 includes a dimension of a working part 6 of the crane 1. The working part 6 of the crane 1 is here in the form of a gripper having two gripper jaws. In the case of an item 12 to be gripped, which is picked up with the gripper, a dimension in the form of a spacing of the gripper jaws relative to each other, which can be detected for example by an opening angle of the gripper jaws, and thus a diameter of the item 12 to be gripped, in the form of a log, can be displayed.

LIST OF REFERENCES

1 crane
2 visualization apparatus
3 camera image
4 operator
5 graphic auxiliary representation
6 working part
7 reference object
8 warning representation
9 marking
10 operating apparatus
11 fall lines
12 item to be gripped
13 projection

The invention claimed is:

1. A crane controller for controlling a crane, the crane controller comprising:
a visualization apparatus configured to:
generate a stereoscopic camera image having depth information of a working environment of the crane to be used by an operator, and
generate a graphic auxiliary representation overlying the stereoscopic camera image, the graphic auxiliary representation representing a dimension to be recognized in the stereoscopic camera image,
wherein the visualization apparatus includes a display device configured to display the stereoscopic camera image together with the overlying graphic auxiliary representation, and
wherein the display device is one of virtual reality goggles or a 3D display screen.

2. The crane controller according to claim 1, wherein the graphic auxiliary representation represents a spacing between a working part of the crane and a reference object in the working environment of the crane.

3. The crane controller according to claim 2, wherein the graphic auxiliary representation includes a warning representation generated when the spacing between working part of the crane and the reference object is below a predetermined value.

4. The crane controller according to claim 2, wherein the working part of the crane and the reference object are predeterminable or predetermined.

5. The crane controller according to claim 2, wherein the spacing between the working part of the crane and the reference object is represented by a marking appearing in size proportionally to the spacing.

6. The crane controller according to claim 5, wherein the marking is located at a surface of the reference object facing towards the working part of the crane.

7. The crane controller according to claim 1, wherein the dimension represented by the graphic auxiliary representation is a dimension of a working part of the crane relative to a reference object in the working environment of the crane.

8. The crane controller according to claim 7, wherein the working part of the crane and the reference object are predeterminable or predetermined.

9. The crane controller according to claim 1, wherein the graphic auxiliary representation represents a dimension of a working part of the crane.

10. The crane controller according to claim 9, wherein the graphic auxiliary representation is located on a surface of a reference object disposed beneath the working part, the surface facing towards the working part of the crane.

11. The crane controller according to claim 9, wherein the working part of the crane is predeterminable or predetermined.

12. A crane comprising the crane controller according to claim 1.

* * * * *